(12) United States Patent
Hirschi

(10) Patent No.: US 10,717,614 B1
(45) Date of Patent: Jul. 21, 2020

(54) SAFETY FLAG SYSTEM FOR LOADING DOCKS

(71) Applicant: Hirschi Services, Inc., West Jordan, UT (US)

(72) Inventor: Jeff Hirschi, West Jordan, UT (US)

(73) Assignee: Hirschi Services, Inc., West Jordan, UT (US)

( * ) Notice: Subject to any disclaimer, the term of this patent is extended or adjusted under 35 U.S.C. 154(b) by 0 days.

(21) Appl. No.: 16/543,013

(22) Filed: Aug. 16, 2019

Related U.S. Application Data

(60) Provisional application No. 62/755,841, filed on Nov. 5, 2018.

(51) Int. Cl.
  *B65G 69/28* (2006.01)
  *G09F 17/00* (2006.01)

(52) U.S. Cl.
  CPC ......... *B65G 69/2876* (2013.01); *G09F 17/00* (2013.01); *G09F 2017/0025* (2013.01); *G09F 2017/0083* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 4,843,373 | A * | 6/1989 | Trickle | B65G 69/003 340/540 |
| 9,564,072 | B2 * | 2/2017 | Senfleben | G09F 21/04 |
| 9,728,020 | B2 * | 8/2017 | Freese | E05F 15/00 |
| 10,106,342 | B2 * | 10/2018 | Avalos | B65G 69/006 |
| 10,329,105 | B2 * | 6/2019 | Hoofard | B65G 69/005 |
| 10,358,858 | B2 * | 7/2019 | Lietz | E05F 15/668 |
| 10,494,205 | B1 * | 12/2019 | Hoofard | G06Q 10/06316 |
| 2003/0197622 | A1 * | 10/2003 | Reynard | B65G 69/003 340/686.1 |
| 2005/0102042 | A1 * | 5/2005 | Reynard | B65G 69/001 700/17 |
| 2005/0254249 | A1 * | 11/2005 | Robbins, III | B65G 69/006 362/485 |
| 2010/0320918 | A1 * | 12/2010 | Hudson | B65G 69/2876 315/156 |

* cited by examiner

*Primary Examiner* — Travis R Hunnings
(74) *Attorney, Agent, or Firm* — Thorpe, North & Western, LLP

(57) ABSTRACT

A safety system for a loading dock indicates to a driver of an associated trailer whether it is safe to move the trailer and that the trailer door is closed and that dock crew and equipment are out of the trailer. The safety system utilizes a dock plate handle and/or a visual safety chain to engage an indicator. The indicator automatically indicates a stop or unsafe state when the dock plate handle and/or the visual safety chain are not engaged. The indicator automatically indicates a go or safe state when the dock plate handle and/or the visual safety chain engage the indicator.

21 Claims, 11 Drawing Sheets

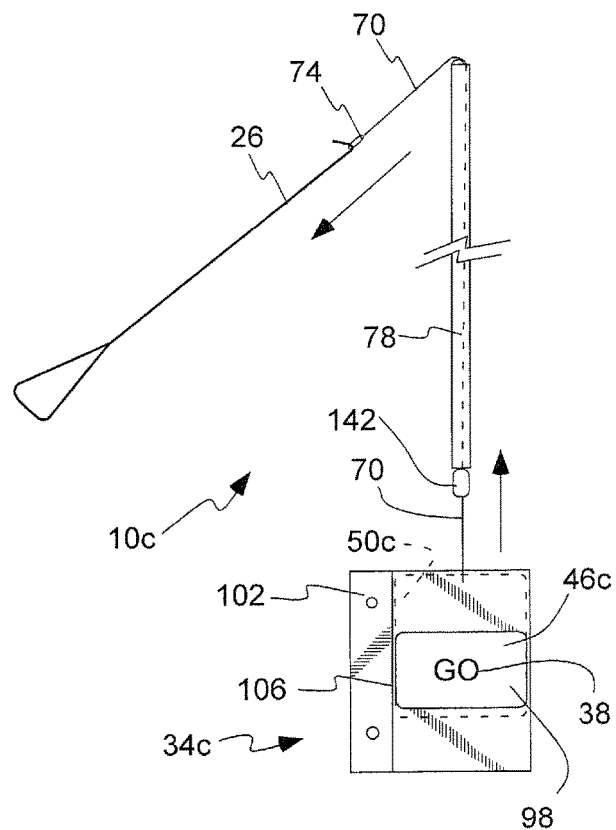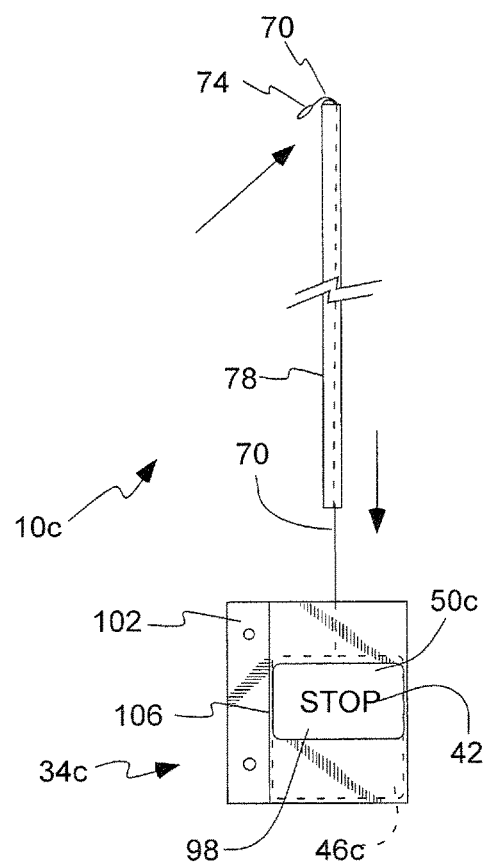
Fig. 9
Fig. 10

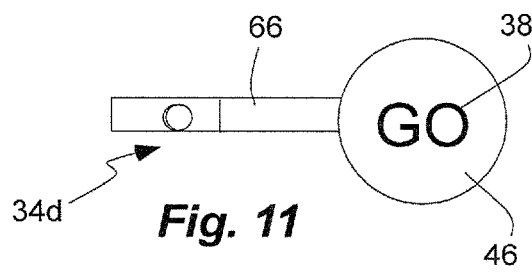
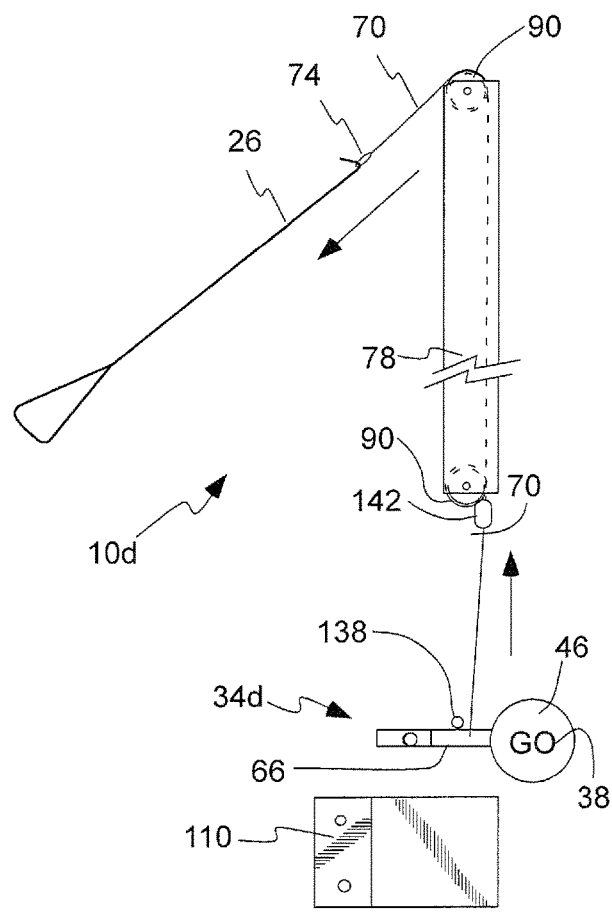
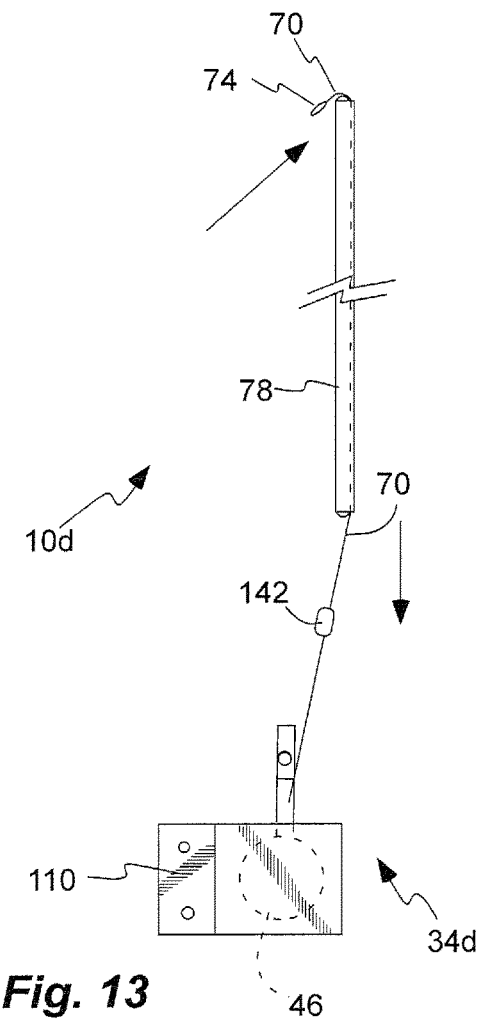
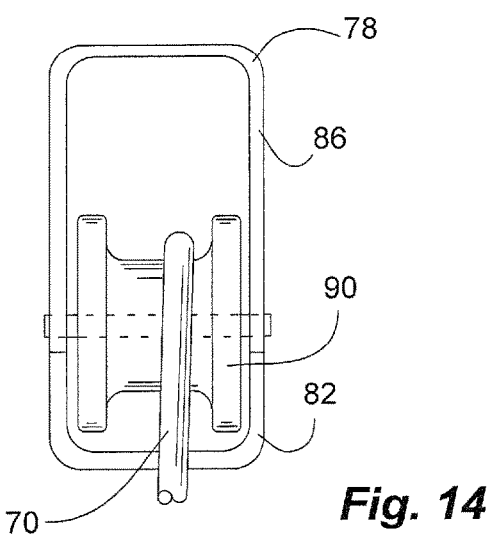
Fig. 11
Fig. 12
Fig. 13
Fig. 14

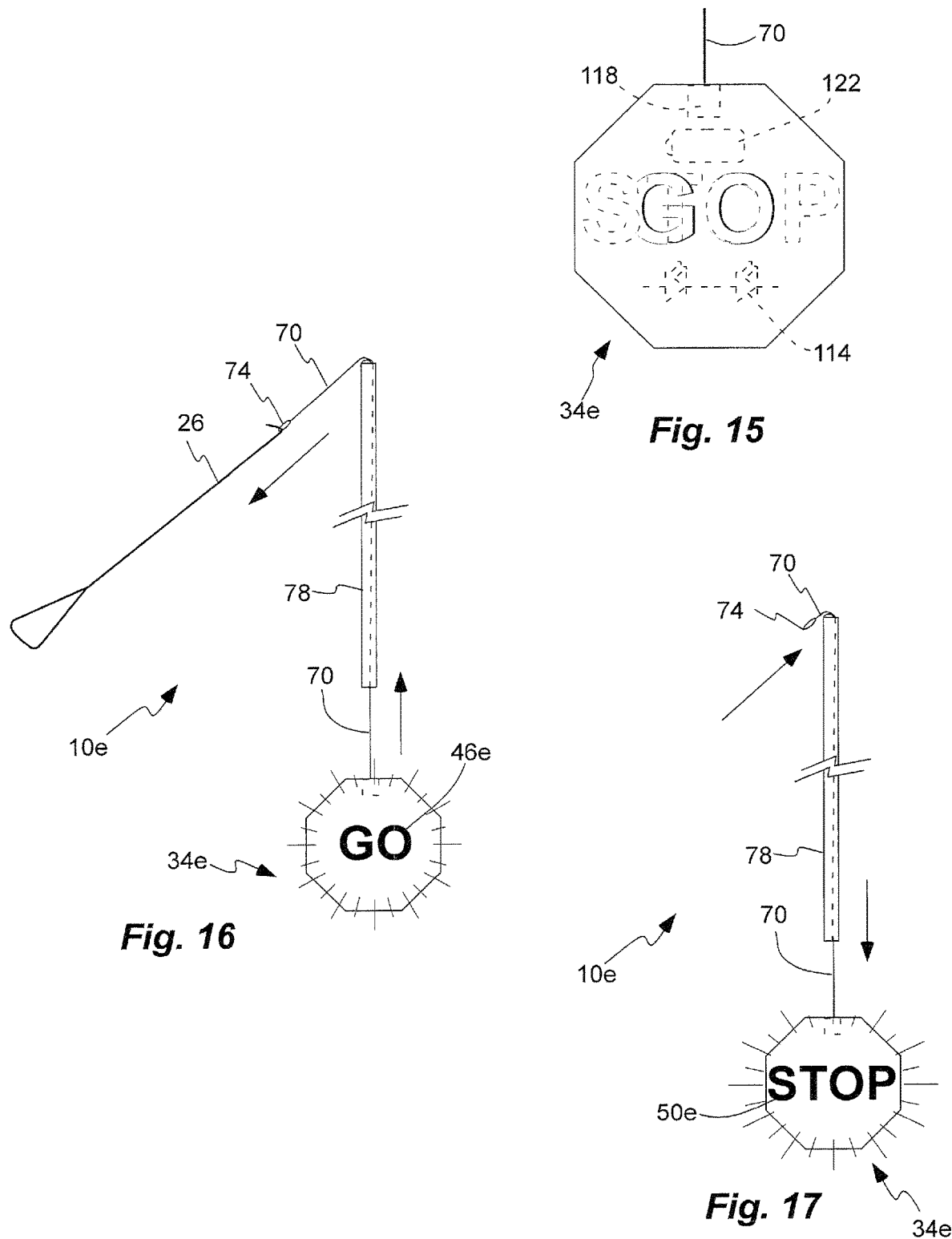

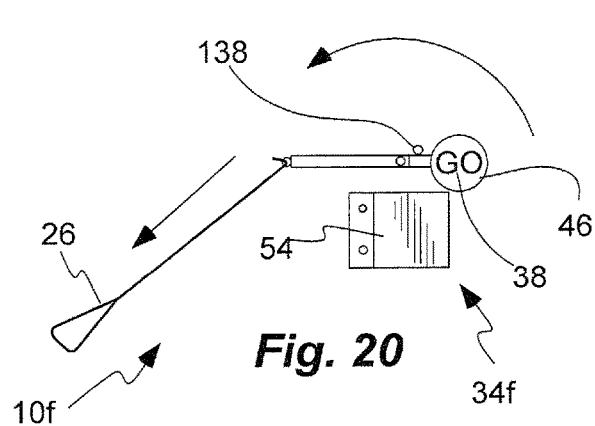
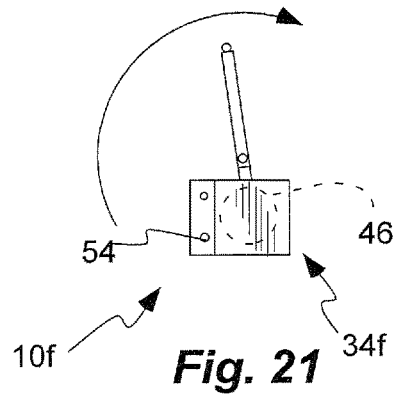
Fig. 20
Fig. 21
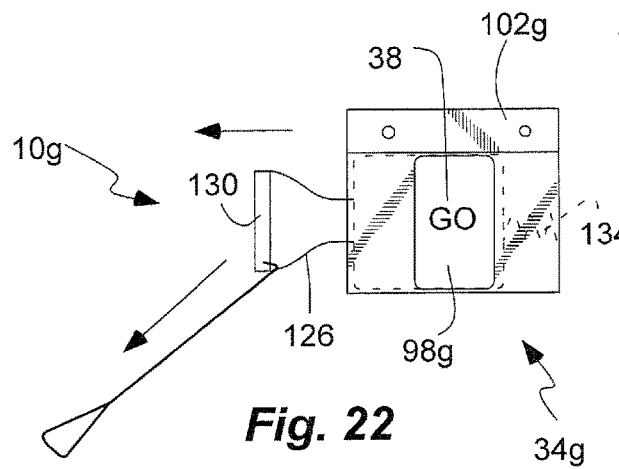
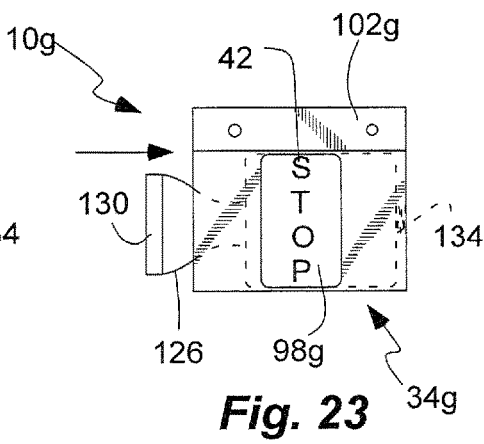
Fig. 22
Fig. 23

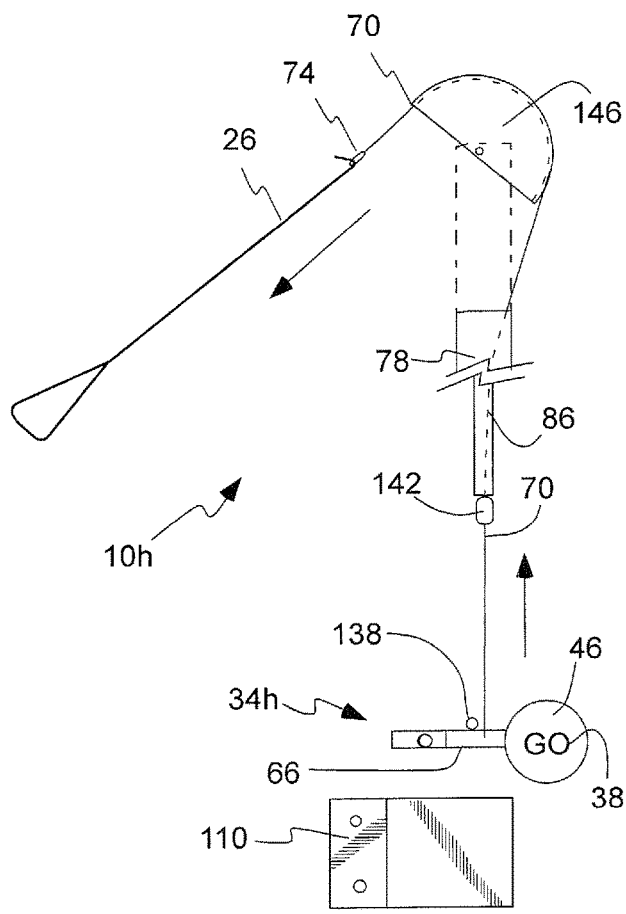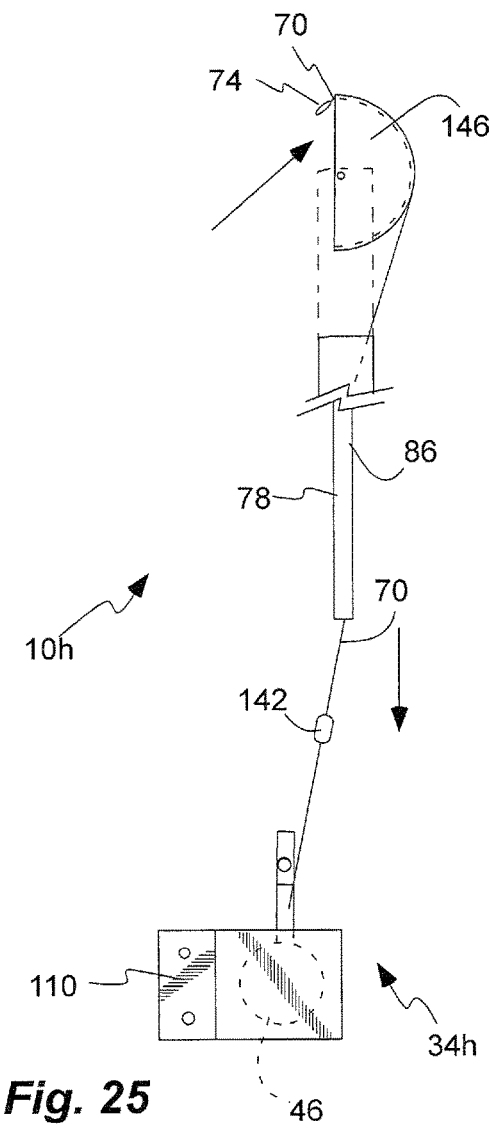
Fig. 24
Fig. 25

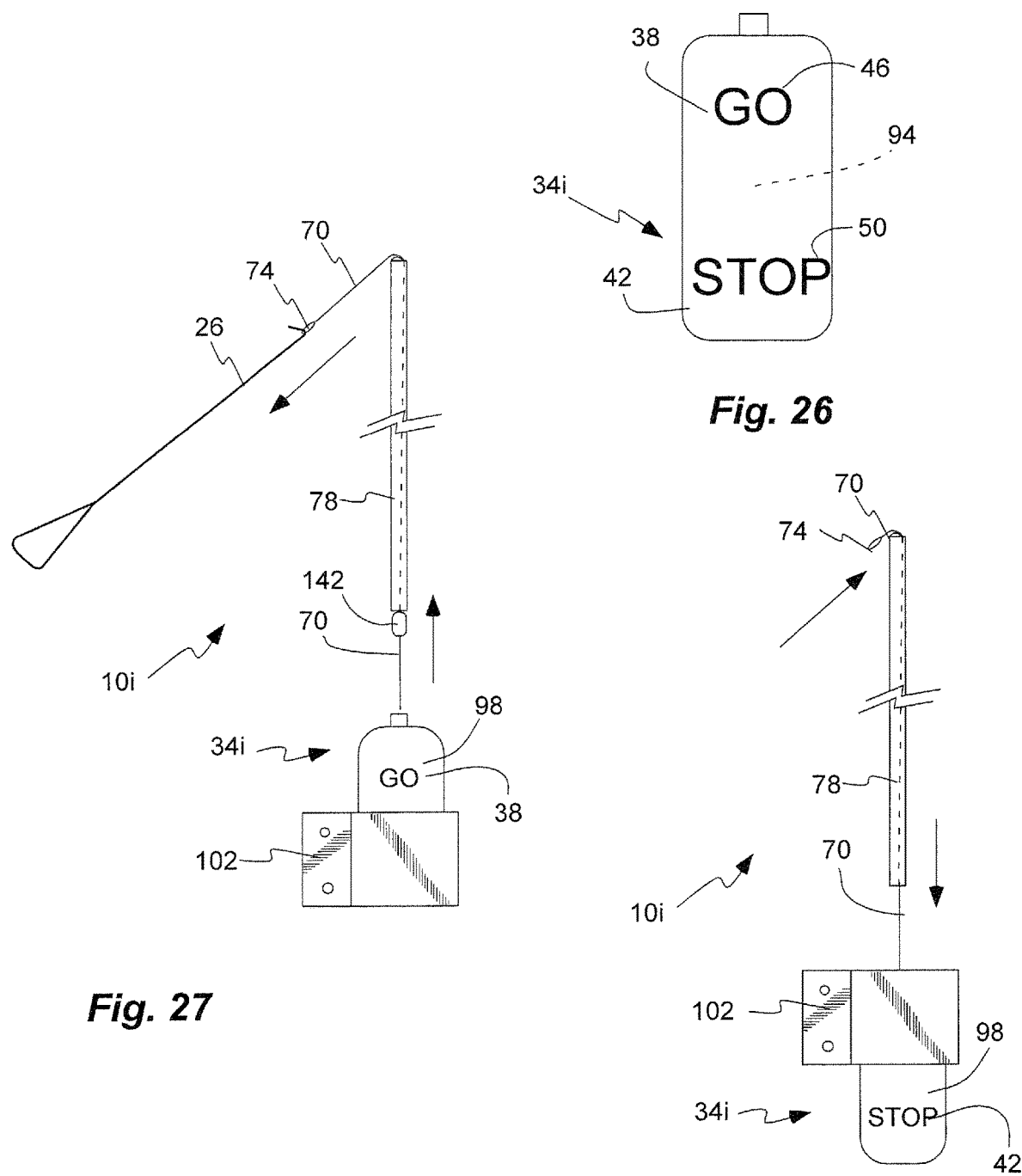

SAFETY FLAG SYSTEM FOR LOADING DOCKS

PRIORITY CLAIM

Priority is claimed to U.S. Provisional Patent Application Ser. No. 62/755,841, filed Nov. 5, 2018, which is hereby incorporated herein by reference.

BACKGROUND

Field of the Invention

The present invention relates generally to a safety system for loading docks. More particularly, the present invention relates to a safety flag system to show a truck driver that a trailer door is closed.

Related Art

Trailers are backed-up to loading docks for loading and/or un-loading of cargo. Sometimes, a truck driver pulls away from the loading dock with the trailer prior to completion of the loading or un-loading, while the trailer door is still open, and/or while dock crew or equipment is still in the trailer. Moving the trailer while dock crew is in, entering or leaving the trailer can present safety issues.

SUMMARY OF THE INVENTION

It has been recognized that it would be advantageous to develop a safety indicator system to indicate to a truck driver that a door of an associated trailer is closed, and that there are no crew in the trailer, and that it is safe to move the trailer.

The invention provides a safety system for a loading dock to indicate whether it is safe to move a trailer from the loading dock. The safety system comprises a visual safety chain to be secured to a wall adjacent the loading dock. The visual safety chain has a length to extend across a door opening of the loading dock. The visual safety chain has at least two configurations, comprising: 1) an open configuration, and 2) a closed configuration. In the open configuration, the visual safety chain is located away from the door opening of the loading dock. In the closed configuration, the visual safety chain extends across the door opening of the loading dock. The safety system also comprises an indicator located outside of the loading dock. The indicator has at least two different states displaying at least two different indicia, comprising: 1) a safe and go state, and 2) an unsafe and stop state. In the go state, the indicator displays go indicium to indicate that it is safe to move the trailer from the loading dock. The go state of the indicator corresponds to the closed configuration of the dock plate handle and the visual safety chain. In the stop state, the indicator displays stop indicium to indicate that it is unsafe to move the trailer from the loading dock. The stop state of the indicator corresponds to the open configuration of the visual safety chain. The visual safety chain operatively engages the indicator in the closed configuration and causes the indicator to automatically switch from the stop state to the go state when engaged by the visual safety chain. The indicator automatically indicates the stop state when the visual safety chain is in the open configuration, and the indicator automatically indicates the go state when the visual safety chain is in the closed configuration.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 3b is a side view of the indicator of FIG. 3a.

FIG. 9 is a schematic detailed view of another safety system in accordance with another embodiment of the invention, shown in the safe or go state.

FIG. 10 is schematic detailed view of the safety system of FIG. 9, shown in the unsafe or stop state.

FIG. 11 is a front view of another indicator of another safety system in accordance with another embodiment of the invention.

FIG. 12 is a schematic detailed view of the safety system of FIG. 11, shown in the safe or go state.

FIG. 13 is schematic detailed view of the safety system of FIG. 11, shown in the unsafe or stop state.

FIG. 14 is an end view of a guide of the safety system of FIG. 11.

FIG. 15 is a front view of another indicator of another safety system in accordance with another embodiment of the invention.

FIG. 16 is a schematic detailed view of the safety system of FIG. 15, shown in the safe or go state.

FIG. 17 is schematic detailed view of the safety system of FIG. 15, shown in the unsafe or stop state.

FIG. 20 is a schematic view of another safety system in accordance with another embodiment of the invention, shown in the safe or go state.

FIG. 21 is a schematic view of the safety system of FIG. 20, shown in the unsafe or stop state.

FIG. 22 is a schematic view of another safety system in accordance with another embodiment of the invention, shown in the safe or go state.

FIG. 23 is a schematic view of the safety system of FIG. 22, shown in the unsafe or stop state.

FIG. 24 is a schematic detailed view of another indicator of another safety system in accordance with another embodiment of the invention, shown in the safe or go state.

FIG. 25 is schematic detailed view of the safety system of FIG. 24, shown in the unsafe or stop state.

FIG. 26 is a front view of another indicator of another safety system in accordance with another embodiment of the invention.

FIG. 27 is a schematic detailed view of the safety system of FIG. 26, shown in the safe or go state.

FIG. 28 is schematic detailed view of the safety system of FIG. 26, shown in the unsafe or stop state.

Figure 1:
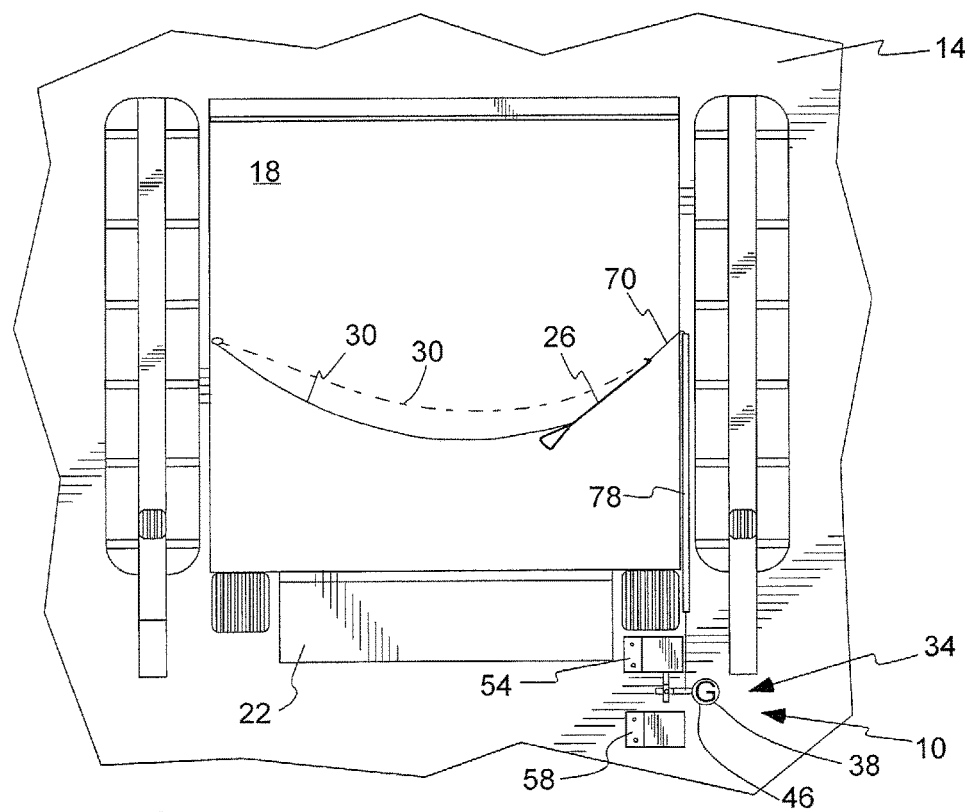
FIG. 1 is a schematic view of a safety system in accordance with an embodiment of the invention, shown in a safe or go state, and shown installed on a loading dock to indicate whether or not it is safe to move a trailer from the loading dock, or if a trailer door is closed, or both, and shown with a dock plate handle and a visual safety chain in a closed configuration across a door opening of the loading dock.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

The invention provides a safety system that can be used with a loading dock to show a driver of an associated trailer whether or not it is safe to move the trailer from the loading dock, and/or that the trailer door is closed and/or open, and/or that dock crew and equipment are out of the trailer. The safety system can be utilized with loading docks with or without curtains or shields. The safety system can be retrofitted to existing loading docks, or can be implemented in new dock construction. The safety system can be mechanical and manually operated by dock crew without the need for electrical wiring. The safety system can be utilized with existing or typical dock equipment, such as a dock plate handle and/or a visual safety chain. The safety system can provide a visual indicator outside of the dock and visible to the driver, while being operable or deployable from within the dock by the dock crew.

The safety system can have an indicator, such as one or more flags, mounted to an exterior wall of the dock. The indicator or flag can have indicia indicative of the state of the trailer. For example, the indicator or flag can have indicium, such as a green color and/or the lettering "go", to indicate that it is safe to move the trailer from the dock. Similarly, the indicator or flag can have different indicium, such as a red color and/or the lettering "stop", to indicate that it is not safe to mover the trailer from the dock. Thus, indicator can have two different states with two different indicia. In one aspect, the safety system can comprise a shield also located outside the dock and mounted to the exterior wall of the dock. The flag and the shield can be movable with respect to one another to selectively shield and selectively indicate a state of the trailer. In one aspect, the shield can be fixed to the wall, while the flag can be movably coupled to the wall or the shield. Thus, the flag can be located behind and visually blocked by the shield to indicate that it is not safe to move the trailer from the dock. The indicator or flag, and the shield, can be positioned and oriented so that they can be observed by a driver of the truck from the cab while looking in the side view mirror. The indicator or flag can be biased to indicate stop, or not safe to move, until deliberately engaged by the dock crew.

The safety system can be operated by the dock crew from inside the dock. In one aspect, the safety system can work in conjunction with the visual safety chain of the dock, and the dock plate handle. The dock plate handle can be retained in the vicinity of the dock, and the dock plate by a chain secured to the wall. In addition, the chain can be utilized as a visual safety chain, and the chain and the dock plate handle can be extended across the door of the dock. In one aspect, the dock plate handle and/or the visual safety chain can engage the safety system, and the weight of the dock plate handle and the safety chain can deploy or activate the indicator or flag. Thus, when the dock crew finishes loading/un-loading the trailer, exit the trailer, and close the trailer door, the safety chain is extended across the door of the dock with the dock plate handle and/or the visual safety chain engaging the safety system and automatically deploying the indicator or flag to signal the driver that the trailer can be moved. While the dock crew is loading/un-loading the trailer, located in the trailer, and the trailer door is open, the safety chain is disposed away from the door of the dock and the safety system automatically deploying the indicator or flag to signal the driver that the trailer should not be moved.

Referring to FIGS. 1-5, an example of a safety system 10 is shown installed on a loading dock 14. The loading dock 14 can have a door opening 18 elevated from the ground and level with respect to a trailer floor (not shown), level with an interior of the dock, and closable by a door. The door opening 18 can be formed in a wall of the loading dock. The door opening 18 can be sized and shaped to accommodate a trailer. The loading dock 14 can have a dock plate 22 in the floor of the dock and that can adjust to a level of the trailer. The loading dock 14 can have and exterior with bumpers and guards to protect the wall from impact of a trailer. In addition, the loading dock 14 can have a curtain or shield on the exterior of the dock and around at least a portion of a perimeter of the door opening 18.

Figure 2:
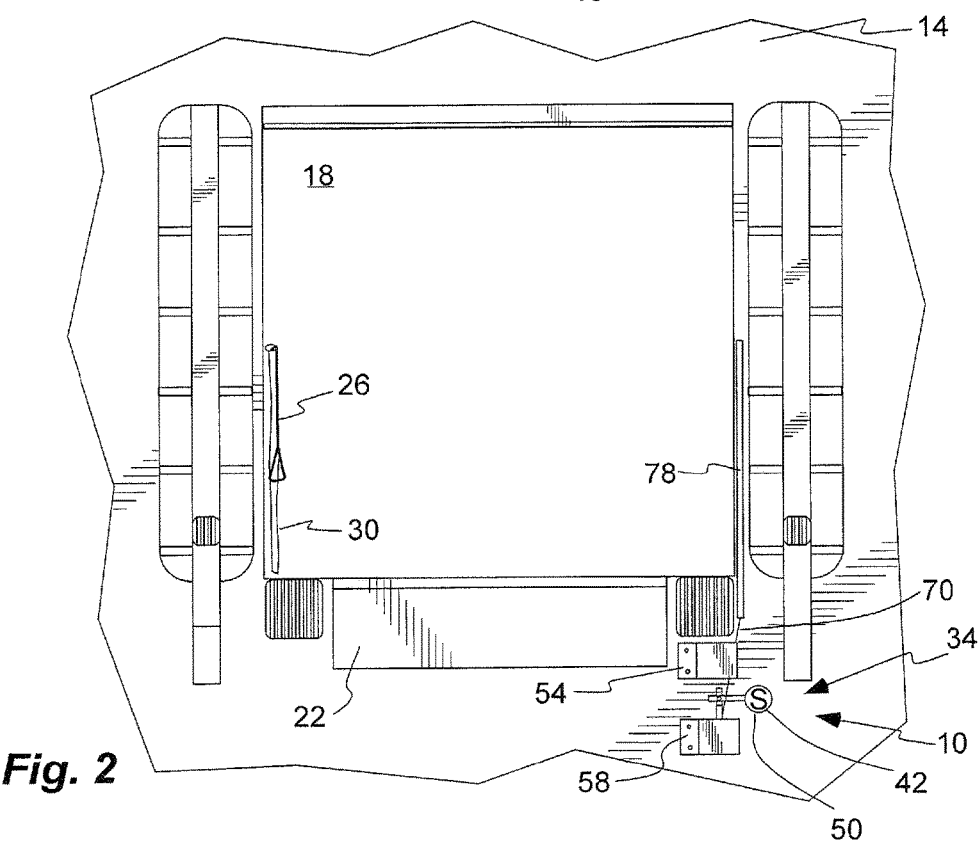
FIG. 2 is a schematic view of the safety system of FIG. 1, shown in an unsafe or stop state, and shown with the dock plate handle and the visual safety chain in an open configuration away from the door opening of the loading dock. A trailer is removed from FIG. 2 for clarity.
Figure 3A:
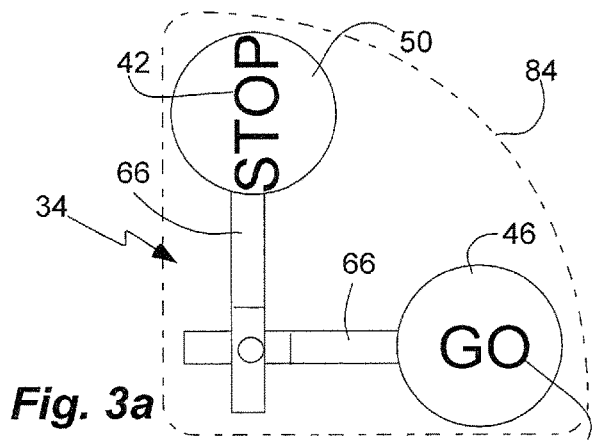
FIG. 3a is a front view of an indicator of the safety system of FIG. 1, showing a pair of different and separate flags with different color or indicium.
Figure 3B:
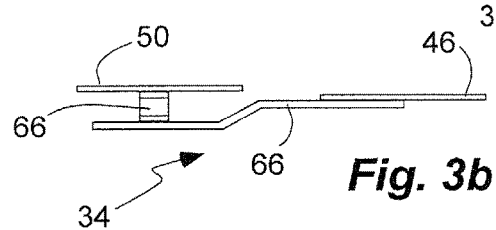

In one aspect, the loading dock 14 can have a dock plate handle 26 and a visual safety chain 30. The dock plate handle 26 can be an elongated rod with a hook on a distal end and a grip on a proximal end. In one aspect, the dock plate handle 26 can hook and pull the dock plate 22 associated with the loading dock 14. In another aspect, the dock plate handle 26 can be as described above, but still be used with loading docks without a dock plate. The dock plate handle 26 can be secured to the wall of the loading dock 14 adjacent to the door opening 18 by the visual safety chain 30. Together, the dock plate handle 26 and the visual safety chain 30 can have a length to extend across the door opening 8 of the loading dock 14, thus providing a visual indicator to resist dock crew from inadvertently walking out an open dock or door opening, as shown in FIG. 1. The dock plate handle 26 and the visual safety chain 30 can have at least two configurations, including: 1) an open configuration, as shown in FIG. 2, and 2) a closed configuration, as shown in FIG. 1. In the open configuration, the dock plate handle 26 and the visual safety chain 30 are located away from the door opening 18 of the loading dock 14, such as along one side of the door opening 18. Unless otherwise specified, the phrase "away from the door opening" means that the visual safety chain 30 is not extending across the door opening 18 of the loading dock 14. In the closed configuration, the dock plate handle 26 and the visual safety chain 30 extend across the door opening 18 of the loading dock 14. In use, the dock crew can finish loading or unloading a trailer at the loading dock, close the trailer door, and string the dock plate handle 26 and the visual safety chain 30 across the door opening 18, in the closed configuration. In the closed configuration, the dock plate handle 26 and/or the visual safety chain 30 can automatically operate the indicator of the safety system 10. Unless otherwise specified, the visual safety chain 30 can be a metal chain, a metal cable, a rope, a strap, a line, or combinations thereof. The visual safety chain 30 can have a thickness and/or a coloring to be highly visible.

In another aspect, the loading dock 14 can have a visual safety chain 30 without a dock plate handle 26. Thus, the visual safety chain 30 itself can have a length to extend across the door opening 18 of the loading dock 14, thus providing a visual indicator to resist dock crew from inadvertently walking out an open dock or door opening, as shown in phantom lines in FIG. 1. The visual safety chain 30 itself can have the least two configurations, including: 1) the open configuration, and 2) the closed configuration. In the open configuration, the visual safety chain 30 is located away from the door opening 18 of the loading dock 14, such as along one side of the door opening 18. In the closed configuration, the visual safety chain 30 extends across the door opening 18 of the loading dock 14. In use, the dock crew can finish loading or unloading a trailer at the loading dock, close the trailer door, and string the visual safety chain 30 across the door opening 18, in the closed configuration. In the closed configuration, the visual safety chain 30 can automatically operate the indicator of the safety system 10. In one aspect, the visual safety chain 30 can be part of, or associated with, the loading dock 14. In another aspect, the visual safety chain 30 can be part of, of associated with, the indicator of the safety system 10, the indicator 34, and/or the cable 70, such as an extension of the cable, as described below. Thus, the visual safety chain 30 and the cable 70 can be a single, continuous cable.

Figure 4:
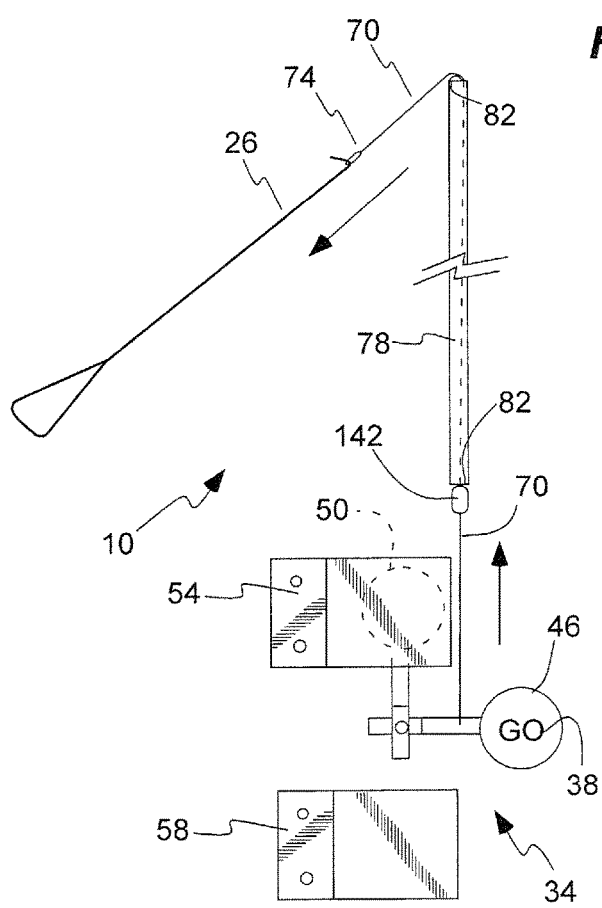
FIG. 4 is a schematic detailed view of the safety system of FIG. 1, shown in the safe or go state.
Figure 5:
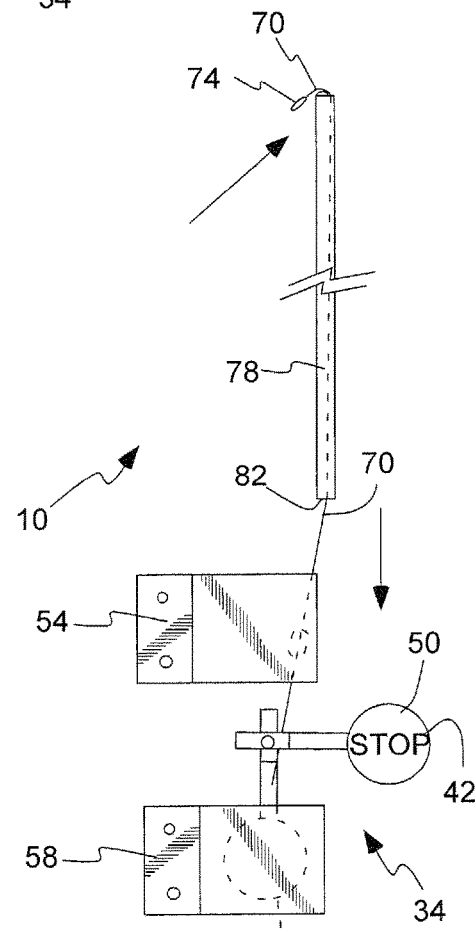
FIG. 5 is schematic detailed view of the safety system of FIG. 1, shown in the unsafe or stop state.

The indicator 34 can be located outside of the loading dock 14. For example, the indicator 34 can be carried by and mounted to an exterior wall of the loading dock 14, and exterior to and adjacent to the door opening 18. In one aspect, the indicator 34 can be located below the door opening 18, and below a floor of the loading dock, due to the dock shield or curtain around or on the lateral sides of the door opening 18. In one aspect, the indicator 34 can have at least two different states displaying at least two different indicia, respectively. The two different states can include: 1) a safe and go state, as shown in FIGS. 1 and 4, and corresponding to the closed configuration of the dock plate handle 26 and the visual safety chain 30; and 2) an unsafe and stop state, as shown in FIGS. 2 and 5, and corresponding to the open configuration of the dock plate handle 26 and the visual safety chain 30. In the safe and go state, the indicator 34 displays safe and go indicium 38 to indicate that it is safe to move the trailer from the loading dock 14, and/or to indicate that the trailer door is closed and dock crew are out of the trailer. In the unsafe and stop state, the indicator 34 displays unsafe and stop indicium 42 to indicate that it is unsafe to mover the trailer from the loading dock. The indicator 34 can separately display two different indicia (e.g. green and/or go indicium 38 and red and/or stop indicium 42) for the two different states of the indicator 34. The indicium (e.g. 38 and 42) can include words, symbols, colors, or combinations thereof. In addition, the indicium can include light reflective material for increased visibility. (The indicium 38 and 42 is shown for ease of viewing the drawings, but can be reversed or mirrored in use for ease of viewing from a side view mirror of a truck associated with a trailer at the loading dock 14.)

The dock plate handle 26 and/or the visual safety chain 30 can operatively engage the indicator 34 in the closed configuration and can cause the indicator 34 to automatically switch from unsafe and stop state to the safe and go state when engaged by the dock plate handle and/or visual safety chain, as shown in FIG. 4. The indicator 34 can automatically indicate the unsafe and stop state when the dock plate handle 26 and/or the visual safety chain 30 are in the open configuration, as shown in FIGS. 2 and 5. Similarly, the indicator 34 can automatically indicate the safe and go state when the dock plate handle 26 and/or the visual safety chain 30 are in the closed configuration, as shown in FIGS. 1 and 4. The indicator 34 can be biased to the unsafe and stop state, such as by the force of gravity. In addition, the safety system 10 can utilize the weight of the dock plate handle 26 and the visual safety chain 30 to transition from the unsafe and stop state, to the safe and go state.

In one aspect, the indicator 34 can comprise a pair of different and separate flags, such as a safe and go flag 46, and an unsafe and stop flag 50. Each flag 46 and 50 can have the indicia 38 and 42, respectively. Thus, each flag 46 and 50 can have a different color or indicium defining the at least two different indicia of the at least two different states. In addition, the indicator 34 can comprise a pair of shields, such as a first or upper shield 54 and a second or lower shield 58. The shields 54 and 58 can be carried by and mounted to the wall of the loading dock 14 and spaced-apart from one another. The pair of flags 46 and 50 can be coupled together and movable between the pair of shields 54 and 58, respectively, to selectively and singularly expose one of the flags 46 or 50 and to selectively and singularly hide the other flag 46 or 50 behind one of the pair of shields. The flags 46 and 50 can be movably with respect to the shields 54 and 58 between: 1) an exposed position, and 2) a shielded position. For example, in the exposed position, the safe and go flag 46, or a portion thereof, is exposed with respect to the shield 58, as shown in FIG. 4. The exposed position of the flag 46 can correspond to the safe and go state to indicate that it is safe to move the trailer from the loading dock 14. In the shielded position, the safe and go flag 46, or a portion thereof, is concealed by the shield 58, as shown in FIG. 5. The shielded position of the flag 46 corresponds to the unsafe and stop state to indicate that it is not safe to mover the trailer from the loading dock 14. In one aspect, the pair of flags 46 and 50 can be coupled together, and can be pivotally coupled to the wall of the loading dock 14 between the pair of shields 54 and 58. The pair of flags 46 and 50 can be pivotal to selectively and singularly expose one of the flags 46 or 50 and to selectively and singularly hide the other flag 46 or 50 behind one of the pair of shields 54 or 58. The shields 54 and 58, or a portion thereof, can be spaced-apart from the wall of the loading dock 14, and can define a gap between the shields 54 and 58 and the wall.

The shields 54 and 58 can comprise a mount plate for being mounted to the wall of the dock. In one aspect, the mount plate can be welded or bolted or adhered to the wall. The shields 54 and 58 can have a shield portion off-set with respect to the mount plate to create a gap between the shield portion and the wall to receive the flag 46 or 50. The shield plate can be sized and shaped to cover the flag 46 or 50. In one aspect, the shield 54 or 58 or the shield plate can be sized larger than the flag 46 or 50. In one aspect, the shield portion and the mount plate can be parallel. A web can connect the shield portion to the mount plate. In one aspect, the shield or cover can be formed of sheet metal that is cut and bent. In another aspect, the shield or cover can be formed of plastic and can be formed by injection molding.

Each flag 46 and 50 can comprise a plate 62 with the indicium 38 and 42, respectively, thereon. Each plate 62 can be carried by an arm 66. The arm 66 can be pivotally coupled to the wall of the loading dock 14. In addition, the arms 66 of the flags 46 and 50 can be coupled together so that they pivot together, and can share a common pivot and fastener to the wall. The arms 66 of the flags 46 and 50 can be oriented at substantially 90 degrees with respect to one another so that one flag can be exposed while the other is shielded. The arms 66 can be angled at an elbow to position the plates 62 away from the wall. In one aspect, the flags can be formed of sheet metal that is cut to shape. In another aspect, the flags and arms can be formed of plastic and can be formed by injection molding.

The dock plate handle 26 and/or the visual safety chain 30 can operatively engage the pair of flags 46 and 50 to selectively and singularly expose the safe and go flag 46. As indicated above, the loading dock 14 can have a dock shield or curtain at the lateral sides of the door opening 18. Thus, the indicator 34, or the flags 46 and 50 and the shields 54 and 58, can be located below an elevation of the door opening 18, with the flags 46 and 50 being pivotal or movable to a location beyond the lateral side of the door opening 14 so that they can be seen beyond a side of the trailer. In one aspect, the dock plate handle 26 can be selectively and operatively coupled to the indicator 30 and the flags 46 and 50 by a cable 70. The cable 70 can have an upper end with an attachment 74 (FIGS. 4 and 5), such as a loop or a hook, to receive the hook of the dock plate handle 26. A lower end of the cable 70 can be coupled to indicator 34 and the flags 46 and 50, or one of the arms 66 thereof. Unless otherwise specified, the cable 70 can be a metal cable, a metal chain, a rope, a strap, a line, or combinations thereof. In another aspect, the cable 70 can have a length to extend across the door opening 18 of the loading dock 14, and can form the visual safety chain 30. For example, the cable 70 can have an attachment 74, such as a hook, that can extend across the door opening 18 of the loading dock 14 and attached to an opposite side.

In addition, a guide 78 can be carried by and mounted to the wall of the loading dock 14 at a one lateral side of the door opening 18, and between the door opening 18 and the dock shield or curtain. The guide 78 can extend from an intermediate position of a height of the door opening 18 (e.g. 3-4 feet from the dock floor) to a position at or below an elevation of a bottom of the door opening 18 or floor of the loading dock 14. The guide 78 can have a hollow or channel receiving the cable 70 therethrough so that the cable 70 extends through the guide 78. In aspect, the guide 78 can have a bearing surface 82 at an upper end against which the cable 70 can bear as is moves through the guide 78. The bearing surface 82 can reduce friction and binding of the cable 70 against the guide 78. In one aspect the bearing surface 82 can be shaped and/or oriented to reduce friction and binding. For example, the bearing surface 82 or upper end of the guide 78 can be inclined with respect to horizontal. In another aspect, the bearing surface 82 can comprise a different material than a material of the guide. For example, the material of the bearing surface 82 can include a low friction material, such as Teflon, to reduce friction and binding. The low friction material can be provided as a block or slider that can be removably and replacably coupled to the guide 78. Similarly, the guide 78 can have a bearing surface 82 at lower end against which the cable 70 can bear as is moves through the guide 78.

In another aspect, the pair of flags 46 and 50 can be coupled together or can be formed as a single piece. In another aspect, the indicator can have a single flag 84, indicated by phantom lines in FIG. 3a, with both the safe and go indicium 38 and the unsafe and stop indicium 42.

Figure 6:
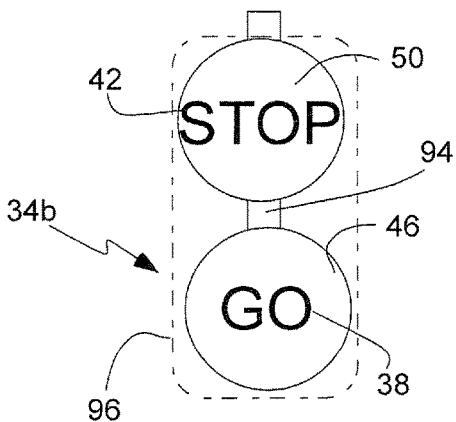
FIG. 6 is a front view of another indicator of another safety system in accordance with another embodiment of the invention, showing a pair of different and separate flags with different color or indicium.
Figure 7:
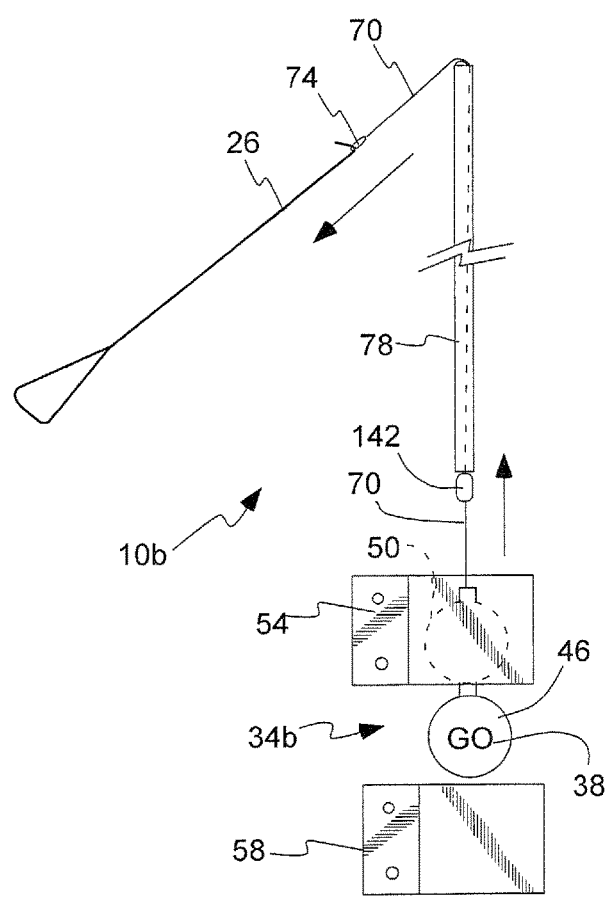
FIG. 7 is a schematic detailed view of the safety system of FIG. 6, shown in the safe or go state.
Figure 8:
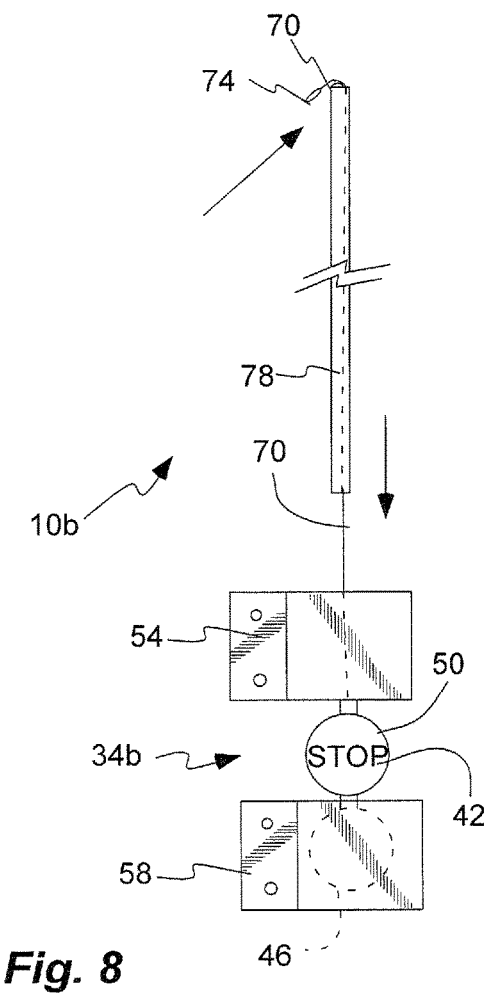
FIG. 8 is schematic detailed view of the safety system of FIG. 6, shown in the unsafe or stop state.
Figure 18:
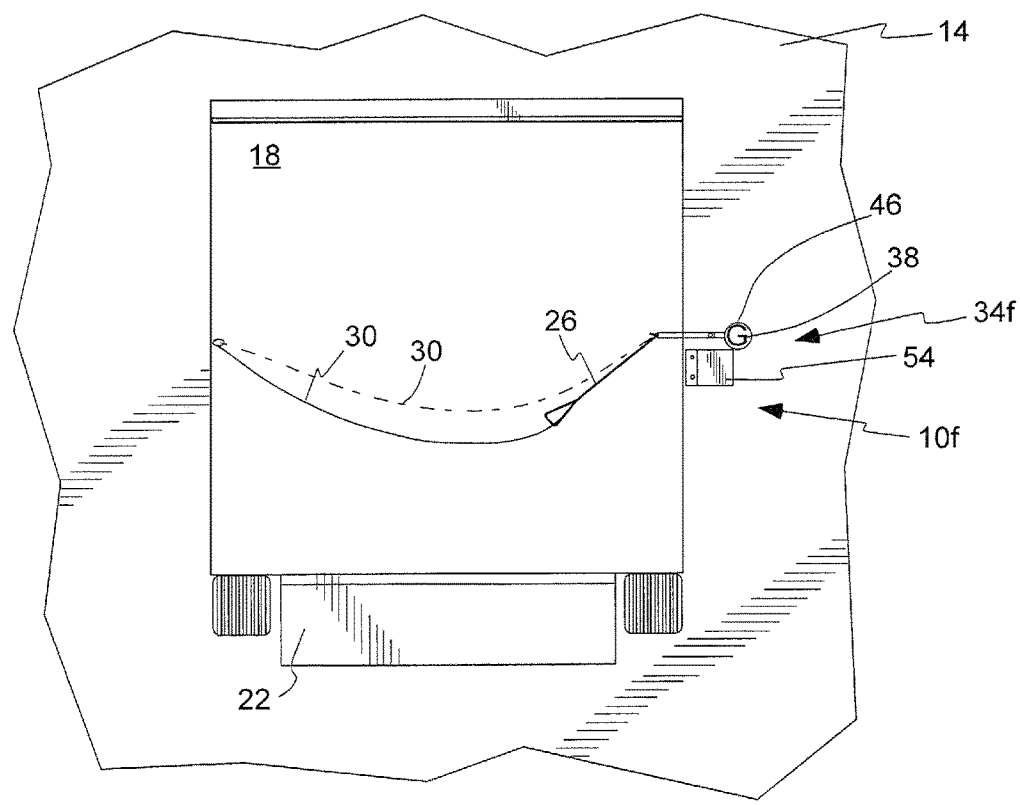
FIG. 18 is a schematic view of another safety system in accordance with another embodiment of the invention, shown in a safe or go state, and shown installed on a loading dock, and shown with the dock plate handle and the visual safety chain in the closed configuration across the door opening of the loading dock.
Figure 19:
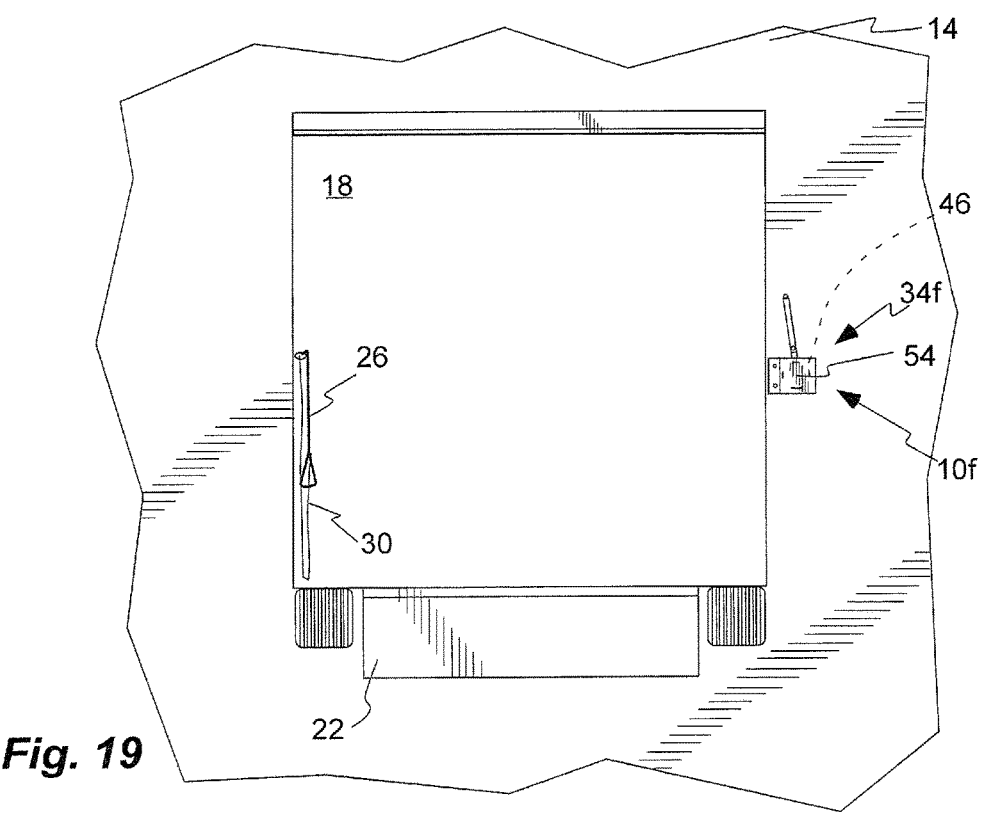
FIG. 19 is a schematic view of the safety system of FIG. 18, shown in the unsafe or stop state, and shown with the dock plate handle and the visual safety chain in the open configuration away from the door opening of the loading dock. A trailer is removed from FIG. 19 for clarity.

Referring to FIGS. 6-8, another safety system 10b is shown that is similar in many respects to that described above, and which description is hereby incorporated herein by reference. The indicator 34b can comprise a pair of different and separate flags, such as a safe and go flag 46, and an unsafe and stop flag 50. Each flag 46 and 50 can have the indicia 38 and 42, respectively. The pair of flags 46 and 50 can be coupled together and movable between the pair of shields 54 and 58, respectively, to selectively and singularly expose one of the flags 46 or 50 and to selectively and singularly hide the other flag 46 or 50 behind one of the pair of shields. The flags 46 and 50 can be movably with respect to the shields 54 and 58 between: 1) an exposed position, and 2) a shielded position. In one aspect, the pair of flags 46 and 50 can be coupled together, and can be movably coupled to the wall of the loading dock 14 between the pair of shields 54 and 58. The pair of flags 46 and 50 can be movable to selectively and singularly expose one of the flags 46 or 50 and to selectively and singularly hide the other flag 46 or 50 behind one of the pair of shields 54 or 58. Thus, the flags 46 and 50 can be selectively exposed in the gap or space between the shields 54 and 58. In one aspect, the flags 46 and 50 can be mounted to a slider 94. A first portion of the slider 94 can be mounted to the wall, while a second portion of the slider can slide with respect to the first. The flags 46 and 50 can be mounted to the second portion of the slider 94.

In another aspect, the pair of flags 46 and 50 can be movably mounted to the pair of shields 54 and 58.

In another aspect, the pair of flags 46 and 50 can be coupled together or can be formed as a single piece. In another aspect, the indicator can have a single flag 96, indicated by phantom lines in FIG. 6, with both the safe and go indicium 38 and the unsafe and stop indicium 42.

Referring to FIGS. 9 and 10, another safety system 10c is shown that is similar in many respects to those described above, and which descriptions are hereby incorporated herein by reference. The indicator 34c can comprise a single flag 98, or the pair of flags 46c and 50c can be coupled together, with both the safe and go indicium 38 and the unsafe and stop indicium 42. In addition, the indicator 34c can have a single shield 102 with an aperture 106 sized and shaped to expose a single indicium 38 or 42 of the single flag 98, or pair of flags 46c and 50c. The shield 102 can form a housing to contain the flag 98 therein. The flag 98 can slide within the shield 102 or housing.

Referring to FIGS. 11-14, another safety system 10d is shown that is similar in many respects to those described above, and which descriptions are hereby incorporated herein by reference. The indicator 34d can comprise a single flag with a single indicium. In one aspect, the single flag can be the safe and go flag 46 with the safe and go indicium 38, as shown. In another aspect, the single flag can be the unsafe and stop flag 50 with the unsafe and stop indicium 42. In addition, the indicator 34d can comprise a single shield 110.

In one aspect, the guide 78 can comprise a tube 86. In one aspect, a pulley or guide bearing 90 can be located in the upper end of the guide 78 and the tube 86. The pulley 90 can be rotatably mounted at the upper end of the guide 78 and the tube 86 and can extend above an open end of the guide 78 and the tube 86 to displace the cable 70 away from the guide 78 and the tube 86. In another aspect, the pulley 90 can reduce a size of an opening or the open end of the guide 78 and the tube 86, and the loop 74 in the cable 70 can be sized larger than the remaining size of the open end of the guide 78 and the tube 86, so that the pulley 90 resists passage of the loop 74 past the pulley 90 and into the guide 78 and the tube 86, and presents the loop 74 to be accessed by the hook of the dock plate handle 26. Similarly, a pulley or guide bearing 90 can be located in the lower end of the guide 78 and the tube 86.

Referring to FIGS. 15-17, another safety system 10e is shown that is similar in many respects to those described above, and which descriptions are hereby incorporated herein by reference. The indicator 34e can comprise a light source 114 associated with the indicator, and capable of displaying at least two different indicia, such as two different colors, words, symbols, or combinations thereof. In one aspect, the light source 114 can be an array of LED lights, with first and second arrays arranged to separately spell the words "go" and "stop", and thus the safe and go indicia 46e and the unsafe and stop indicia 50e. In another aspect, the light source 114 can be an array of LED lights with first and second arrays separately emitting green and red light, and thus the indicia 46e and 50e. In another aspect, the light source 114 can be an array of LED lights with a first array emitting green light and arranged to spell the word "go" (and thus the safe and go indicia 46e), and a second array emitting red light and arranges to spell the word "stop" (and thus the unsafe and stop indicia 50e), at different times. Thus, the indicator 34e can have at least two different indicia of the at least two different states formed by the least two different colors, indicia and/or symbols, of the light source 114. In one aspect, the light source 114 and LEDs can be carried by and contained in a housing of the indicator 34e. In addition, the indicator 34e can have a switch 118 coupled to the cable 70 and operatively coupled to the light source 114. In one aspect, the indicator 34e can be carried by and contained in the housing of the indicator. Furthermore, the indicator 34e and/or the safety system 10e can have a power source 122, such as batteries, operatively coupled to the switch 118 and the light source 114. In another aspect, the power source can comprise an AC power, a DC power source, a solar power source, etc.

Referring to FIGS. 18-21, another safety system 10f is shown that is similar in many respects to those described above, and which descriptions are hereby incorporated herein by reference. The indicator 34f can be located adjacent a lateral side of the door opening 18 if there is no dock curtain or if there is room. Thus, the flag 46 and the shield 54 can be mounted laterally with respect to the door opening 18. The flag 46 can be mounted to a distal end of an arm and the arm can be pivotally mounted to the wall of the dock. The proximal end of the arm can have a loop engagable by the hook of the dock plate handle 26. The pivot can be located such that the flag 46 and the distal end of the arm have a heavier weight to pivot under the force of gravity behind the shield 54 when not engaged by the dock plate handle 26 and/or the visual safety chain 30. Thus, the flag 46 can be biased in the unsafe or stop position by gravity.

Referring to FIGS. 22-23, another safety system 10g is shown that is similar in many respects to those described above, and which descriptions are hereby incorporated herein by reference. The indicator 34g can be located adjacent a lateral side of the door opening 18. In addition, the indicator 34g can comprise a single flag 98g, with the indicia 38 and 42 thereon, and a single shield 102g with an aperture 106 sized and shaped to expose a single indicium 38 or 42 of the flag 98g. The indicator 34g can also have a handle 126 with a grip 130 extending therefrom and beyond the shield 102g. Thus, the handle 126 or grip 130 can be grasped by hand and positioned, or can receive the hook of the dock plate handle 26. Furthermore, the flag 98g can be biased in the unsafe or stop position by a spring 134 or the like.

Referring to FIGS. 24 and 25, another safety system 10h is shown that is similar in many respects to those described above, and which descriptions are hereby incorporated herein by reference. The indicator 34h can comprise a single flag with a single indicium. In one aspect, the single flag can be the safe and go flag 46 with the safe and go indicium 38, as shown. In another aspect, the single flag can be the unsafe and stop flag 50 with the unsafe and stop indicium 42. In addition, the indicator 34h can comprise a single shield 110.

In one aspect, the safety system 10h can comprise a cam 146 with the cable 70 thereon. The cam 146 can have a channel therein and around a perimeter thereof to receive the cable 70. In one aspect, the cam 146 can be affixed to, and pivotally mounted with respect to, the wall of the loading dock, as shown. In another aspect, the cam 146 can be carried by, and pivotally mounted with respect to, the guide 78 or the tube 86, as shown in phantom lines. The cam 146 can pivot with respect to the wall of the loading dock and/or the guide 78. The cam 146 can resist wear on the cable 70 and/or the guide 78 or the tube 86 as the cable 70 moves.

Referring to FIGS. 26-28, another safety system 10i is shown that is similar in many respects to those described above, and which description is hereby incorporated herein by reference. The indicator 34i can comprise a single flag 98 with both the safe and go indicium 38 and the unsafe and stop indicium 42 thereon. In addition, the indicator 34i can have a single shield 102, to selectively and singularly expose one of the indicia 38 or 42 and to selectively and singularly hide the other indicia 38 or 42 behind the shield 102. One indicium, such as the safe and go indicium 38, can be exposed on one side of the shield 102, such as the top, while the other indicium, such as the unsafe and stop indicium 42, can be exposed on an opposite side of the shield, such as the bottom. The single flag 98, the single shield 102, the indicia 38 and 42, and the spacing between the indicia 38 and 42 can be sized so that only a single indicium 38 or 42 is exposed, and on opposite sides of the shield 102. The flag 98 can be movably coupled to and carried by the shield 102.

In addition, the safety system can have a stopper limit movement or travel of the flag and the shield with respect to one another. The stopper can limit the travel of the cable and/or the flag. In one aspect, the stopper 138 can be affixed to the wall and located to abut to the flag 46 or arm 66 thereof when the flag is in position, such as the safe and go position, as shown in FIGS. 12 and 20. In another aspect, the stopper 142 can be an enlargement coupled to the cable 70 to abut to the bottom of the guide 78 when the flag is in position, as shown in FIGS. 4, 7, 9 and 12. In another aspect, the stopper can be part of the shield or housing.

In any of the embodiments described above, the cable 70 can be replaced by a link arm or rod.

Figure 29:
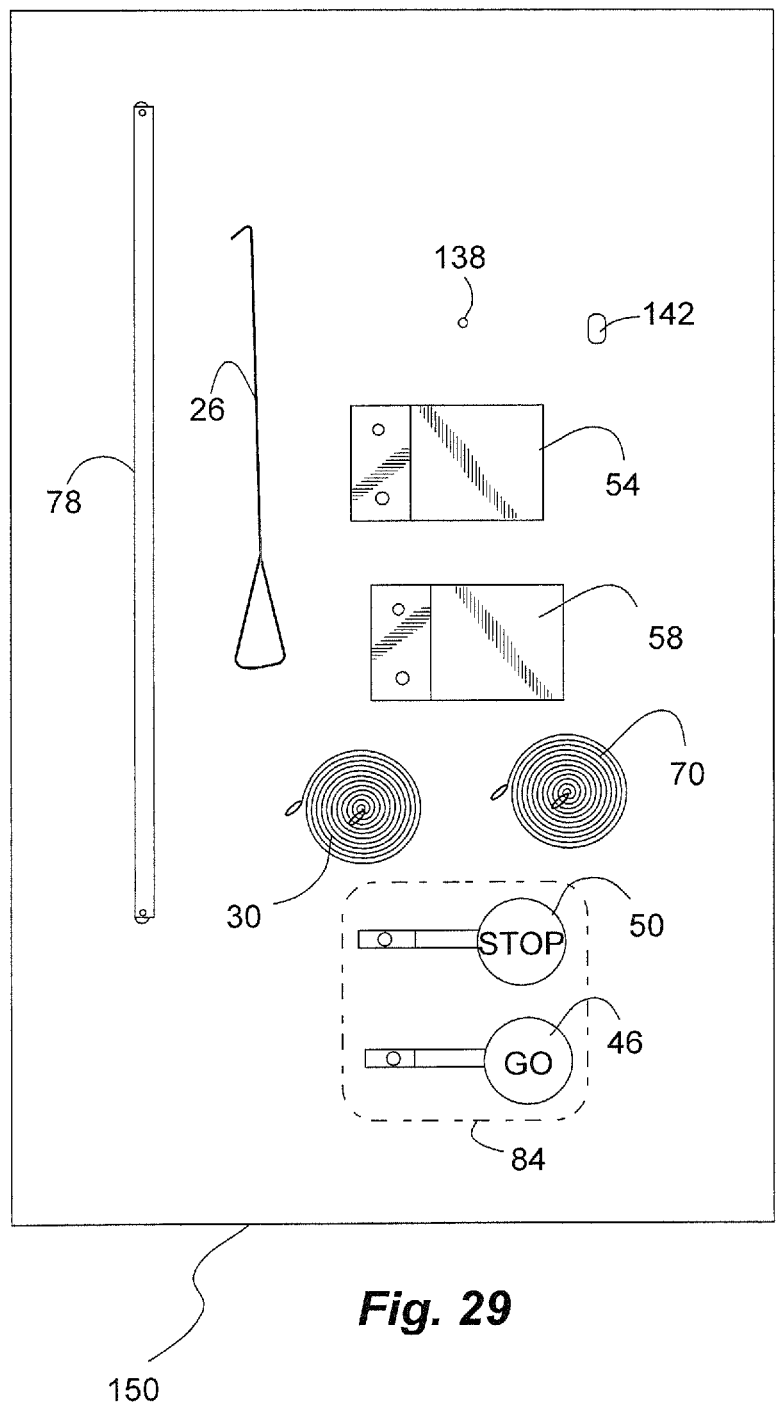
FIG. 29 is a schematic view of a kit of parts for a safety system in accordance with an embodiment of the invention.

Referring to FIG. 29, the safety systems described above can be provided as a kit 150 for installation on an existing loading dock, or a new loading dock. The kit 150 can have different components than those shown.

In one aspect, the components can be made from non-corrosive materials, such as galvanized steel, stainless steel, or plastic. In one aspect, the cable 70 can be galvanized. Similarly, the shields and the flags can be galvanized. The guide or tube can be galvanized or stainless steel. In another aspect, the components can be made from another man-made material.

Any of the above mentioned embodiments can be combined in whole or in part. Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A safety system configured for a loading dock and configured to indicate whether it is safe to move a trailer from the loading dock, the safety system comprising:
    a) a visual safety chain configured to be secured to a wall adjacent the loading dock;
    b) the visual safety chain having a length to extend across a door opening of the loading dock and having at least two configurations, comprising:
        i) an open configuration in which the visual safety chain is located away from the door opening of the loading dock; and
        ii) a closed configuration in which the visual safety chain is configured to extended across the door opening of the loading dock;
    c) an indicator configured to be located outside of the loading dock, the indicator having at least two different states displaying at least two different indicia, comprising:
        i) a go state in which the indicator displays go indicium to indicate that it is safe to move the trailer from the loading dock, the go state of the indicator corresponding to the closed configuration of the visual safety chain; and
        ii) a stop state in which the indicator displays stop indicium to indicate that it is unsafe to move the trailer from the loading dock, the stop state of the indicator corresponding to the open configuration of the visual safety chain;
    d) the visual safety chain operatively engaging the indicator in the closed configuration and causing the indicator to automatically switch from the stop state to the go state when engaged by the visual safety chain; and
    e) the indicator automatically indicating the stop state when the visual safety chain is in the open configuration, and the indicator automatically indicating the go state when the visual safety chain is in the closed configuration.

2. The safety system in accordance with claim 1, wherein the indicator further comprises:
    a) a shield configured to be carried by the wall of the loading dock; and
    b) a flag being movable with respect to the shield between:
        i) an exposed position in which at least a portion of the flag is exposed with respect to the shield; and
        ii) a shielded position in which at least a portion of the flag is concealed by the shield.

3. The safety system in accordance with claim 2, further comprising:
    a) a guide configured to be carried by the wall of the loading dock;
    b) a cable extending through the guide and having a lower end coupled to the flag, and an upper end with an attachment configured to receive the visual safety chain; and
    c) a bearing surface at the upper end, or the lower end, or both, of the guide against which the cable can bear, the bearing surface comprising a different material than a material of the guide.

4. The safety system in accordance with claim 3, wherein the bearing surface comprises a pulley or guide bearing.

5. The safety system in accordance with claim 4, wherein the guide comprises a tube and wherein the pulley or guide bearing is located in the tube to reduce an opening of the tube to resist passage of the attachment of the cable into the tube.

6. The safety system in accordance with claim 1, wherein the indicator further comprises:
    a pair of different and separate flags with each flag comprising a different color or indicium defining the at least two different indicia of the at least two different states.

7. The safety system in accordance with claim 6, wherein the indicator further comprises:
    a) a pair of shields configured to be carried by the wall of the loading dock and spaced-apart from one another; and
    b) the pair of flags being coupled together and movable between the pair of shields, respectively, to selectively and singularly expose one of the flags and to selectively and singularly hide the other flag behind one of the pair of shields.

8. The safety system in accordance with claim 7, wherein the indicator further comprises:
    a) the pair of flags being pivotally coupled to the wall of the loading dock; and
    c) the pair of flags being pivotal to selectively and singularly expose one of the flags and to selectively and singularly hide the other flag behind one of the pair of shields.

9. The safety system in accordance with claim 1, wherein the indicator further comprises:
    a shield configured to be carried by the wall of the loading dock; and an aperture formed in the shield and sized and shaped to expose a single indicium.

10. The safety system in accordance with claim 1, further comprising:
a dock plate handle configured to hook and pull a dock plate associated with the loading dock;
the visual safety chain coupled to the dock plate handle; and
the visual safety chain operatively engaging the indicator in the closed configuration with the dock plate handle.

11. The safety system in accordance with claim 1, wherein the indicator further comprises:
a light source associated with the indicator, and capable of displaying at least two different colors; and wherein the at least two different indicia of the at least two different states of the indicator comprise the at least two different colors of the light source.

12. A safety system configured for a loading dock and configured to indicate whether it is safe to move a trailer from the loading dock, the safety system comprising:
a) a dock plate handle configured to hook and pull a dock plate associated with the loading dock;
b) a visual safety chain coupled to the dock plate handle and configured to be secured to a wall adjacent the loading dock;
c) the dock plate handle and the visual safety chain having a length to extend across a door opening of the loading dock and having at least two configurations, comprising:
   i) an open configuration in which the dock plate handle and the visual safety chain are located away from the door opening of the loading dock; and
   ii) a closed configuration in which the dock plate handle and the visual safety chain are configured to extended across the door opening of the loading dock;
d) a shield configured to be carried by the wall of the loading dock;
e) a flag being movable with respect to the shield between:
   i) an exposed position in which at least a portion of the flag is exposed with respect to the shield; and
   ii) a shielded position in which at least a portion of the flag is concealed by the shield;
f) a guide configured to be carried by the wall of the loading dock;
g) a cable extending through the guide and having a lower end coupled to the flag, and an upper end with an attachment;
h) a pulley or guide bearing located at the upper end of the guide, or the lower end of the guide, or both, against which the cable can bear, and the pulley reducing an opening of the guide;
i) the dock plate handle engaging the attachment of the cable in the closed configuration and causing the flag to automatically switch between the exposed and shielded positions when engaged by the dock plate handle; and
j) the flag automatically indicating a stop state when the dock plate handle and the visual safety chain are in the open configuration, and the flag automatically indicating a go state when the dock plate handle and the visual safety chain are in the closed configuration.

13. The safety system in accordance with claim 12, further comprising:
the exposed position of the flag corresponding to the go state to indicate that it is safe to move the trailer from the loading dock; and
the shielded position of the flag corresponding to the stop state to indicate that it is not safe to mover the trailer from the loading dock.

14. The safety system in accordance with claim 12, wherein the flag further comprises:
a pair of different and separate flags with each flag comprising a different color, or indicium, or both.

15. The safety system in accordance with claim 14, wherein:
a) the shield comprises a pair of shields configured to be carried by the wall of the loading dock and spaced-apart from one another; and
b) the pair of flags are coupled together and movable between the pair of shields, respectively, to selectively and singularly expose one of the flags and to selectively and singularly hide the other flag behind one of the pair of shields.

16. The safety system in accordance with claim 15, wherein:
a) the pair of flags are pivotally coupled to the wall of the loading dock; and
c) the pair of flags are pivotal to selectively and singularly expose one of the flags and to selectively and singularly hide the other flag behind one of the pair of shields.

17. The safety system in accordance with claim 12, wherein the shield further comprises:
an aperture formed in the shield and sized and shaped to expose a single indicium of the flag.

18. A safety system configured for a loading dock and configured to indicate whether it is safe to move a trailer from the loading dock, the loading dock having a visual safety chain having a closed configuration extending across a door opening of the loading dock, the safety system comprising:
a) an indicator configured to be located outside of the loading dock, the indicator having at least two different states displaying at least two different indicia, comprising:
   i) a go state in which the indicator displays go indicium to indicate that it is safe to move the trailer from the loading dock, the go state of the indicator corresponding to the closed configuration of the dock plate handle; and
   ii) a stop state in which the indicator displays stop indicium to indicate that it is unsafe to move the trailer from the loading dock;
b) the indicator being engaged by the visual safety chain in the closed configuration; and
c) the indicator automatically indicating the stop state when the visual safety chain is disengaged, and the indicator automatically indicating the go state when the visual safety chain is engaged in the closed configuration.

19. The safety system in accordance with claim 18, wherein the indicator further comprises:
a) a shield configured to be carried by the wall of the loading dock and defining a gap between the shield and the wall; and
b) a flag being movable with respect to the shield between:
   i) an exposed position in which at least a portion of the flag is exposed with respect to the shield, the exposed position corresponding to the go state to indicate that it is safe to move the trailer from the loading dock; and
   ii) a shielded position in which at least a portion of the flag is concealed by the shield, the shielded position corresponding to the stop state to indicate that it is not safe to mover the trailer from the loading dock.

20. The safety system in accordance with claim 19, further comprising:
   a) a guide configured to be carried by the wall of the loading dock;
   b) a cable extending through the guide and having a lower end coupled to the flag, and an upper end with an attachment; and
   c) a pulley or guide bearing at the upper end of the guide, or the lower end of the guide, or both, against which the cable can bear.

21. The safety system in accordance with claim 18, wherein the indicator further comprises:
   a) a pair of different and separate flags with each flag comprising a different color, or indicium, or both;
   b) a pair of shields configured to be carried by the wall of the loading dock and spaced-apart from one another; and
   c) the pair of flags being pivotal to selectively and singularly expose one of the flags and to selectively and singularly hide the other flag behind one of the pair of shields.

* * * * *